United States Patent Office 3,370,902
Patented Feb. 27, 1968

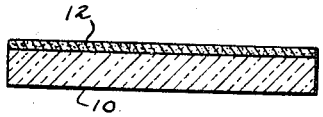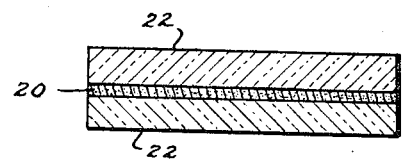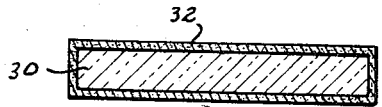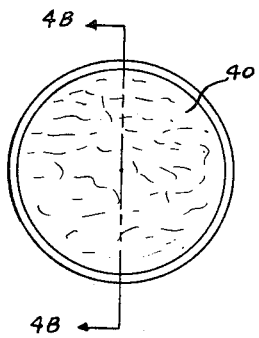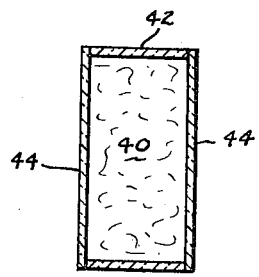

3,370,902
SELF-ATTENUATING VARIABLE DENSITY LIGHT
FILTER LENS AND COMPOUNDS FOR MAKING
Sidney Allinikov, 202 N. Walnut St.,
Yellow Springs, Ohio 45387
Filed July 16, 1963, Ser. No. 295,569
6 Claims. (Cl. 350—160)

ABSTRACT OF THE DISCLOSURE

A self-attenuating variable density light filtering compound for use with the lenses of flash protection goggles consisting essentially of a triphenylmethane dye and a bisulfite activated proteolytic enzyme in a carrier solution.

The invention described herein may be manufactured and used by or for the Government for governmental purposes without the payment to me of any royalty thereon.

This invention relates to variable density light filter lenses used to protect the eyes against high intensity illumination and to compounds used in making such protective lenses.

In the past, triphenylmethane dyes have been considered for such applications. Normally, a shutter or light valve of this type is made by dissolving a quantity of dye in a suitable solvent such as water or a dilute alcohol solution. The dye is then reduced to the leuco state by the addition of a reducing agent such as sodium bisulfite. When such a solution is exposed to sunlight, or some other source of ultraviolet irradiation, the solution reverts to the colored state with an attending change in its light transmission characteristic. Upon removal of the light source, the solution returns to the leuco state; thus allowing a higher degree of light transmission. Such compounds have also been incorporated into a plastic film such as polyvinyl butyral for application to transparent materials as a coating. They have also been used in solution between two layers of transparent optical material.

The past practice has had several inherent disadvantages and drawbacks including:

(a) The degree of color change becomes progressively less with each forward-reverse cycle; and is completely devoid of color sensitivity after about fifty (50) cycles.

(b) Under prolonged exposure to light (approximately 30 minutes) the solution or coating fades from the colored to the leuco state, due to the influence of infrared irradiation, and (c) The reverse reaction from the colored to the leuco state upon removal of the irradiation source is comparatively slow; especially in a coating. This reaction has been observed to require from one (1) hour to sixteen (16) hours to completely reverse in coating form, and approximately twenty (20) minutes in solution form.

This invention produces a highly fatigue-resistant, light-actuated, self-attenuating, variable density light filter by use of an enzyme in conjunction with a phototropic dye.

One object of the present invention is to provide a variable density light filter having a prolonged forward-reverse cycling life.

Another object of the present invention is to provide a variable density light filter having a faster reaction rate from the colored to the colorless state, when the irradiating light source is removed.

A further object of the invention is to provide a variable density light filter which will not revert to the colorless state in the presence of infrared light.

Yet another object of the present invention is to provide a protective lens having an improved variable density light filtering compound.

It has been observed in an aqueous solution containing a triphenylmethane dye, that a proteolytic enzyme such as papain, ficin or pepsin would slowly reduce the dye to the colorless state. It was also observed that when the colorless solution was exposed to ultraviolet light, it would revert back to the colored state. The addition of a bisulfite enzyme activator, such as sodium bisulfite, to the solution markedly increased the reaction rate from the colored to the colorless state upon removal of the solution from exposure to the light source. It was also found that the solution, so formed, could be subjected to continuous forward-reverse cycling with no apparent loss in the degree of color change or sensitivity long after a similar solution without an enzyme became completely fatigued.

Not only was the rate of the color change from colorless to colored increased, but the reverse cycle rate from the colored to the leuco state was also increased by the addition of an enzyme. The reversal from the colored to the leuco state, which is dependent upon pH and concentrations, was obtained in a matter of seconds when using solutions and within approximately one (1) minute in a gel type coating.

The speed of response to an ultraviolet light source, and degree of color change is dependent upon the concentration of dye, enzyme, pH of solution, and intensity of the light source. Color changes were observed with minimal concentrations of $6.95 \times 10^{-5}$ g./me. papain to $8.2 \times 10^{-7}$ g./me. dye, up to concentrations approaching solubility limits, under exposure to an ultraviolet light source.

The formulations of phototropic materials in regard to concentrations, classes and types of constituents depend upon specific application requirements such as desired response rates, degree of color change, color intensities, light intensities, reversibility and form in which the phototropic material is desired. The following formulas have been found to give excellent results.

SOLUTION

| Chemical: | Weight (g.) |
|---|---|
| Triphenylmethane dye (malachite green) | 0.03 |
| Bisulfite activated proteolytic enzyme (papain) | 1.60 |
| Water | 100.00 |

COATING

| Chemical: | |
|---|---|
| Triphenylmethane dye (malachite green) | 0.03 |
| Bisulfite activated proteolytic enzyme (papain) | 1.60 |
| Methyl alcohol | 1.00 |
| Film former (polyvinyl alcohol) | 5.00 |
| Water | 100.00 |

GEL

| Chemical: | |
|---|---|
| Triphenylmethane dye (malachite green) | 0.03 |
| Bisulfite activated proteolytic enzyme (papain) | 1.60 |
| Gelling agent (guar gum) | 1.00 |
| Water | 100.00 |

In the above formulas, the dye may be any suitable dye of the group; used either singly, or in combination. Typical dyes of the group are malachite green, acid fuschin or rosanaline red. Likewise, proteolytic enzyme may be any enzyme of the group, such as papain, pepsin and ficin. In the coating formula, the methyl alcohol acts as a diluent to the polyvinyl alcohol. Although desirable, the methyl alcohol may be omitted.

While not limited to such use, light filters in accordance with this invention are extremely useful in making flash protection goggles for viewing high intensity flashes as generated by atomic and nuclear explosions. Typical lenses for such goggles, using light filtering compounds made in accordance with the above formulas are shown on the drawing in which:

FIG. 1 is a cross section through a typical transparent lens element 10 coated on one side with a light filtering compound 12 made in accordance with the coating or gel formula.

FIG. 2 is a cross section through another typical transparent lens showing a light filtering compound 20 made in accordance with the coating or gel formula sandwiched between two transparent lens elements 22.

FIG. 3 is a cross section through still another typical lens showing a transparent lens element 30 completely surrounded by a light filtering compound 32 made in accordance with the coating formula.

FIG. 4A is a front elevation and FIG. 4B is a vertical section through a lens unit and showing a light filtering compound 40 made in accordance with the solution or gel formula encased in a hollow cell comprising a tube 42 having a transparent facing element 44 cemented or otherwise joined in place over each opening in the tube.

All the elements shown on the drawing, except the light filtering compounds, may be made of quartz or any other material which does not adversely impede the rays from the light source.

It is to be understood that the embodiment of the present invention as shown and described is to be regarded as illustrative only and that the invention is susceptible to variations, modifications and changes within the scope of the appended claims.

I claim:

1. A self attenuating variable capacity density light filtering compound for use with lenses of flash protection goggles and consisting essentially of about 0.03 g. of a triphenylmethane dye selected from the group consisting of malachite green, acid fuschin and rosanaline red and about 1.60 g. of a bisulfite activated proteolytic enzyme selected from the group consisting of papain, pepsin and ficin in a carrier solution selected from the group consisting of water and methyl alcohol.

2. A self-attenuating variable density light filtering compound for use with lenses of flash protection goggles consisting essentially of about the following proportions by weight of malachite green dye 0.03 g., a bisulfite activated papain enzyme 1.60 g., and water 100.00 g.

3. A self-attenuating variable density light filtering compound for use with lenses of flash protection goggles consisting of about the following proportions by weight malachite green dye 0.03 g., a bisulfite activated papain enzyme 1.60 g., polyvinyl alcohol as a film former 5.00 g. and water 100.00 g.

4. A lens for flash protection goggles and the like comprising a hollow cell having a tube and a transparent facing element joined over each opening of said tube, and a self-attenuating variable density light filtering compound within said hollow cell; said componud consisting essentially of about the following proportions by weight: malachite green dye 0.03 g., a bisulfite activated papain 1.60 g. and water 100.00 g.

5. A lens for flash protection goggles and the like comprising one or more transparent lens elements and a self-attenuating variable density light filtering compound adjacent to at least one surface on each of said lens elements; said compound consisting essentially of about the following proportions by weight of malachite green triphenylmethane dye 0.03 g., a bisulfite activated papain 1.60 g., polyvinyl alcohol as a film former 5.00 g., and water 100.00 g.

6. A lens for flash protection goggles and the like comprising one or more transparent lens elements and a self-attenuating variable density light filtering compound adjacent to at least one surface on each of said lens elements; said compound consisting essentially of about the following proportions by weight of malachite green triphenylmethane dye 0.03 g., a bisulfite activated papain 1.60 g., guar gum as a gelling agent 1.00 g., and water 100.0 g.

References Cited

UNITED STATES PATENTS 1,845,835   2/1932   Frankenburger et al. _ 88—106 X

MURRAY KATZ, *Primary Examiner.*

LEON D. ROSDOL, *Examiner.*

R. D. LOVERING, *Assistant Examiner.*